United States Patent
Lobmann et al.

(10) Patent No.: US 6,387,446 B1
(45) Date of Patent: May 14, 2002

(54) METHOD FOR DEPOSITING TITANIUM OXIDE LAYERS USING SOLUBLE POWDERS

(75) Inventors: Peer Lobmann, Wurzburg; Rainer Jahn, Veitshochheim; Stephan Merklein, Selgenstadt, all of (DE)

(73) Assignee: Fraun-Hofer-Gesellschaft Zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/555,256

(22) PCT Filed: Aug. 30, 1999

(86) PCT No.: PCT/EP99/06374

§ 371 Date: Sep. 22, 2000

§ 102(e) Date: Sep. 22, 2000

(87) PCT Pub. No.: WO00/20337

PCT Pub. Date: Apr. 13, 2000

(30) Foreign Application Priority Data

Oct. 1, 1998 (DE) .......................................... 198 45 291

(51) Int. Cl.$^7$ ................................................. B05D 3/02
(52) U.S. Cl. .................................................... 427/372.2
(58) Field of Search ...................................... 427/372.2

(56) References Cited

U.S. PATENT DOCUMENTS 5,049,371 A * 9/1991 Rinn et al. ................... 423/592
5,403,368 A * 4/1995 Takahashi et al. ............ 65/17.2

OTHER PUBLICATIONS

Scolan et al, Mater. Res. Soc. Symp. Proc., 519, pp. 329–335, 1998.*

Znaidi et al, Mater. Res. Bull. 36(5–6), pp 811–825, 2001.*

Kato, K. et al, "Crystal Structures of TiO$_2$ Thin Coatings Prepared From the Alkoxide Solution Via the Dip–Coating Technique Affecting the Photocatalytic Decomposition of Aqueous Acetic Acid", Journal of Materials Science 29 (1994), pp. 5911–5915.

Kato, K. et al, "Morphology of Thin Anatase Coatings Prepared From Alkoxide Solutions Containing Organic Polymer, Affecting the Photocatalytic Decomposition of Aqueous Acetic Acid", Journal of Materials Science 30 (1995), pp. 837–841.

Ohzuku, Tsutomu, "An Electrochromic Display Based on Titanium Dioxide", Electrochimica Acta, vol. 27, No. 9, (1982), pp. 1263–1266.

Tohge, Noboru, "Fine–Patterning on Glass Substrates by the Sol–Gel Method", Journal of Non–Crystalline Solids 100 (1988), pp. 501–505.

* cited by examiner

Primary Examiner—Erma Cameron
(74) Attorney, Agent, or Firm—Burns, Doane, Swecker & Mathis, L.L.P.

(57) ABSTRACT

A sol-gel process for the production of titanium oxide layers which comprises the following stages:
- (i) preparation of a soluble, titanium-containing powder by:
  - (a) reaction of a titanium alcoholate of the general formula Ti(OR)$_4$, in which the radicals R are identical or different and represent straight-chain, branched or cyclic alkyl or alkenyl radicals having 1 to 10 carbon atoms, which optionally have one or more carbonyl and/or ester and/or carboxyl functions, with one or more polar compounds with completing, chelating properties,
  - (b) heating of the solution,
  - (c) adding of water to the solution, optionally in the presence of a catalyst,
  - (d) concentrating of the solution until a powder is obtained,
- (ii) dissolving of the powder to form a sol,
- (iii) coating of a substrate with the sol and
- (iv) heating of the coated substrate, described.

24 Claims, No Drawings

METHOD FOR DEPOSITING TITANIUM OXIDE LAYERS USING SOLUBLE POWDERS

The invention relates to a process for the deposition of titanium oxide layers on any desired substrates. The invention particularly relates to a sol-gel process in which a soluble powder which can be redissolved again in many solvents and solvent mixtures is first prepared. The coating solution prepared from the powder can be used for the production of, inter alia, electrochromic monitors, optical reflective layers, photocatalytic layers and photoanodes.

The use of $TiO_2$ for such purposes is described, for example, in the following publications:

T. Ohzuko, T. Hirai, Electrochemica Acta, 27 (1982), 1263; H. Pulker, Thin film Science and Technology, Elsevier, Amsterdam (1984), volume 6; and J. Livage, in Better Ceramics Through Chemistry, MRS, Pittsburgh, Pa. (1988), 717.

The photocatalytic purification of waste waters is another promising use of this material (cf. K. Kato, A. Tsuzuki, Y. Torii, H. Taoda, T. Kato, Y. Butsugan, J. Mat. Sci., 30 (1995), 837 and K. Kato, A. Tsuzuki, Y. Torii, H. Taoda, T. Kato, Y. Butsugan, J. Mat. Sci., 29 (1994), 5911). Compared with physical or physical/chemical deposition methods, such as sputtering, vaporization, chemical vapour deposition and metal-organic decomposition, wet chemical preparation via the sol-gel process offers a large number of advantages: No cost-intensive coating apparatuses using the vacuum technique are necessary, large areas can easily be coated, and the inside of cylindrical substrates is also readily accessible to coating solutions. The process temperatures needed are low compared with conventional oxide-ceramic processes, which allows coating of metals or glass substrates. Such processes are described, for example, in Sol-Gel Science, The Physics and Chemistry of Sol-Gel Processing (Academic Press, Boston, 1990).

Coating solutions employed in the sol-gel process are as a rule prepared from metal alcoholates and transition metal alcoholates. Since these compounds are not stable to hydrolysis, their storage stability under normal conditions is limited. Chemical modification of the alkoxides by complexing agents is also does not always lead to a stabilization of the solutions which is satisfactory for industrial uses.

The invention is therefore based on the object of providing a process for the deposition of titanium oxide layers which does not have the abovementioned disadvantages. The invention is furthermore based on the object of providing a process for the deposition of $TiO_2$ which allows deposition with a layer thickness of more than 150 nm within one coating step. The process here should also allow coating of large areas of substrates of different composition (various glasses, ceramic substrates, steel) and variable geometry (flat specimens, tubes).

The invention relates to a process for the preparation of titanium oxide layers which comprises the following stages:
 (i) preparation of a soluble, titanium-containing powder by:
  (a) reaction of a titanium alcoholate of the general formula $Ti(OR)_4$, in which the radicals R are identical or different and represent straight-chain, branched or cyclic alkyl or alkenyl radicals having 1 to 10 carbon atoms, which optionally have one or more carbonyl and/or ester and/or carboxyl functions, with one or more polar compounds with complexing, chelating properties,
  (b) heating of the solution,
  (c) adding water to the solution, optionally in the presence of a catalyst,
  (d) concentrating the solution until a powder is obtained,
 (ii) dissolving of the powder to form a sol,
 (iii) coating of a substrate with the sol and
 (iv) heating of the coated substrate.

According to a preferred embodiment of this process, titanium alcoholates of the general formula $Ti(OR)_4$ in which R represents a straight-chain or branched alkyl radical having 2 to 6 carbon atoms are employed. It is furthermore preferable for one or more of the radicals OR in the abovementioned formula to be derived from oxo-esters, β-diketones, carboxylic acids, ketocarboxylic acids or ketoalcohols. It is particularly preferable for the radical OR to be derived from acetylacetone. Examples of suitable titanium alcoholates are $Ti(OEt)_4$, $Ti(Oi\text{---}Pr)_4$, $Ti(On\text{---}Pr)_4$ and $Ti(AcAc)_2(Oi\text{---}Pr)_2$.

Instead of synthesizing a coating solution directly, according to the invention a soluble titanium-containing powder is first prepared. In this procedure, a titanium alcoholate is reacted with a polar, complexing and chelating compound. Such compounds are, for example, diketones, P-ketoesters, acetylacetone, glycol ethers, diols, polyhydric alcohols, aminoalcohols, glycerol, hydroxydiols, aminothiols, dithiols, diamines or mixtures thereof.

The use of diketones, in particular 1,3-diketones, such as acetylacetone, is particularly preferred.

The polar complexing and chelating compound is employed in the process according to the invention in an amount of 0.5 to 20 mol, preferably 0.5 to 3 mol/mol of titanium alcoholate.

After the reaction of the titanium alcoholate with the polar complexing and chelating compound, the resulting solution is heated to a temperature in the range from room temperature up to the boiling point of the solvent, preferably to 80 to 100° C., over a period of up to 24 hours, preferably over a period of 0.5 to 2 hours.

An amount of 0.5 to 20, preferably 1 to 3 mol of $H_2O$ per mol of titanium alcoholate is then added to the solution, optionally in the presence of a catalyst ($H_3O^+$, $OH^-$) or dilute inorganic or organic acids or alkalis, such as $HNO_3$, HCl, NaOH or $NH_3$, or dilute solutions of metal salts, such as $NaBF_4$, and the mixture is concentrated, preferably under reduced pressure. A pulverulent solid which has a titanium oxide content of 30 to 55 wt. % is obtained by this procedure.

The powder according to the invention has an unlimited storage stability in air.

The powder according to the invention can be redissolved in numerous solvents or solvent mixtures and can thus be used for the preparation of a coating solution for the deposition of titanium oxide layers, which the invention also provides. Suitable solvents are alcohols, diols, diol ethers, amines, water and mixtures thereof. Important properties of the coating solution, such as solids contents and viscosity, can be adjusted in a controlled manner and matched to the coating process and substrate by the choice of solvents or solvent mixtures.

Suitable alcohols are aliphatic alcohols, in particular methanol, ethanol, isopropanol and butanol.

Suitable diol ethers are e.g. methoxyethanol, butoxyethanol or isopropoxyethanol.

Suitable diols are those of the general formula $HO(CH_2)_nOH$, in which n represents an integer from 2 to 8, such as e.g. ethanediol, propanediol, butanediol etc. Alcohols of higher functionality or polyols, such as e.g. glycerol, can also be employed in the process according to the invention.

Suitable amines are mono-, di- or trialkylamines, the alkyl groups of which can optionally be substituted by one or more OH group(s). Preferred amines have the general formula $NR_xR'_{3-x}$, wherein R and R' can be identical or different and can represent methyl, ethyl, hydroxyethyl and hydrogen and x denotes an integer from 0 to 3.

The coating solutions according to the invention preferably comprise water.

Coating solutions which comprise a mixture of propanediol, triethanolamine and water as the solvent are especially preferred, the best results being achieved with coating solutions which comprise the abovementioned solvents in a weight ratio of 60:10:30 at a solids content of 15% titanium dioxide.

To prepare the coating solution according to the invention, the solvent or solvent mixture is mixed with the titanium-containing powder. For this, the solvent is preferably initially introduced into the mixing vessel and the powder is added in portions.

The mixture is then heated to a temperature in the range from room temperature up to the boiling point of the solvent mixture, preferably in the range from 80 to 1000° C., over a period of 10 to 60 minutes, so that a colloidal solution (sol) results.

The refractive index of the thin layers can be freely chosen in the range between 1.5 and 2.4 by addition of silicon alcoholates to the $TiO_2$ sols prepared in this way.

The preferred ratio of titanium alcoholate to silicon alcoholate is 9:91. Suitable silicon alcoholates which can be admixed are silicon alcoholates of the general formula $Si(OR)_4$, in which the radicals R are identical or different and represent straight-chain, branched-chain or cyclic alkyl or alkenyl radicals having 1 to 10 carbon atoms, which optionally have one or more carbonyl and/or ester and/or carboxyl functions.

Preferred silicon alcoholates are $Si(OEt)_4$ and $Si(OMe)_4$.

The titanium oxide content of the sol is 0.1 to 30%, preferably about 15% (per cent by weight), depending on the mixing ratio of titanium-containing powder to solvent or solvent mixture.

A large number of types of substrates are very readily wettable by the sols according to the invention. Depending on the coating process, $TiO_2$ layers with a thickness of up to 0.8 $\mu$m can be deposited by a single coating and subsequent heating at a temperature of 550° C. Suitable coating processes are known per se to the expert and are described, for example, in Sol-Gel Science, The Physics and Chemistry of Sol-Gel Processing, Academic Press (1990).

Surprisingly, when the coating solution according to the invention is used, no drying step on the wet film is necessary before the exposure to heat. At a layer thickness of more than 0.4 $\mu$m, the layers have a net-like crazed structure. Surprisingly, these layers have a good adhesion even to borosilicate glass.

If auxiliary substances such as polyethylene glycol are added to the coating solutions, fine structures can be imprinted into the layers (cf. N. Toghe et al., J. Non-Cryst. Solids, 100 (1988), 501).

It is furthermore possible to incorporate doping into the titanium oxide layers by incorporating corresponding components in the solvent or solvent mixture during the preparation of the coating solution according to the invention. Such components are, for example, compounds of transition and internal transition elements, such as iron, nickel, manganese and neodymium, which are soluble in the solvent mixtures.

A substantial advantage of the process according to the invention and of the titanium-containing powder used in the process and of the coating solution prepared therefrom is that the powder has a high solids content in respect of $TiO_2$ and has an unlimited storage stability in air. The powder dissolves very readily in numerous solvents and solvent mixtures without a residue. Many sol properties which are essential for the coating process can be established in a controlled manner by the choice of solvent/solvent mixture without the powder synthesis having to be changed. The layer thicknesses which can be achieved with a single coating are furthermore very high.

The invention is illustrated in more detail by the following examples:

USE EXAMPLE 1

Synthesis of the Powder 100 g acetylacetone are added dropwise to 284 g titanium n-propylate, while stirring. The solution is heated at 80° C. for one hour. After addition of 54 g deionized water, the mixture is concentrated on a rotary evaporator under reduced pressure. A pulverulent, yellow-red solid with a titanium oxide content of 43% by weight results.

USE EXAMPLE 2

Preparation of the Sol 185 g of the powder are added in relatively small portions to 356 g of a solvent mixture of propanediol, triethanolamine and water in a weight ratio of 60:10:30. After heating at 50° C. for one hour, a clear sol results. The titanium oxide content is 15% by weight.

USE EXAMPLE 3

Preparation of the Layer

The sol is introduced into a vertically arranged is borosilicate tube, the lower opening of which has been closed with a bored stopper. Lowering of the level of liquid is achieved by pumping off. The resulting layer thickness can be adjusted by the speed of pumping off, and at 16 mm/min ceramic layers 0.6 $\mu$m thick are achieved. Directly after the coating operation, the tube is heated at 550° C. in a circulating air oven for 30 minutes.

After the exposure to heat at 550° C., the titanium oxide is present in the anatase form and the layers show photocatalytic activity in degradation experiments with the model substance dichloroacetic acid.

The coating sols can also be deposited on the inside of tubular substrates by closing off the bottom with a bored stopper, introducing the sol and leaving a well-defined wet film remaining on the substrate by draining off or pumping off. Astonishingly, better results can be achieved for internal coatings on tubes at relatively high pumping-off speeds than for coating of flat specimens.

What is claimed is:

1. Sol-gel process for the preparation of titanium oxide layers, comprising the following stages:
   (i) preparing a soluble, titanium-containing powder by:
      (a) reacting a titanium alcoholate reactant of the general formula $Ti(OR)_4$, in which the radicals R are identical or different and represent straight-chain, branched or cyclic alkyl or alkenyl radicals having 1 to 10 carbon atoms, which optionally have one or more carbonyl and/or ester and/or carboxyl functions, with one or more polar compound reactant having complexing, chelating properties, (b) heating the reactants, (c) adding water to the reactants, optionally in the presence of a catalyst, (d) concentrating the reactants until a powder is obtained, (ii) dissolving the powder in a solvent to form a sol, (iii) coating a substrate with the sol and (iv) heating the coated substrate.

2. Process according to claim 1, wherein the polar compound comprises: diketones, β-ketoesters, acetylacetone, glycol ethers, diols, polyhydric alcohols, aminoalcohols, glycerol, hydroxydiols, arninothiols, dithiols, diamines or mixtures thereof.

3. Process according to claim 2, wherein the polar compound comprises: acetylacetone and the titanium alcoholate comprises titanium n-propylate.

4. Process according to claim 1, wherein the titanium-containing powder is dissolved in a solvent chosen from the group consisting of alcohols, diols, diol ethers, amines and water or mixtures thereof.

5. Process according to claim 4, wherein the solvent comprises a mixture of propanediol, triethanolamine and water.

6. Process according to claim 1, wherein the substrate comprises: glass, ceramic and/or metal.

7. Process according to claim 6, wherein the substrate comprises borosilicate glass.

8. Process according to claim 1, wherein the substrate comprises a flat specimen or a tube.

9. Process according to claim 1, wherein at least one auxiliary substance is added to the sol.

10. Titanium-containing soluble powder for the deposition of titanium oxide layers, obtained by (a) reacting a titanium alcoholate with a diketone, (b) heating the solution, (c) adding water to the solution, optionally in the presence of a catalyst, and (d) concentrating the solution until a powder is obtained.

11. Titanium-containing powder according to claim 10, which it has a titanium content of 30 to 55 wt. %.

12. Coating solution for the preparation of titanium oxide layers, comprising a colloidal solution of the titanium-containing powder according to claim 10 in a solvent comprising: alcohol, a diol, an amine, water or mixtures thereof.

13. Coating solution according to claim 12, further comprising silicon alcoholates of the general formula $Si(OR)_4$, in which the radicals R are identical or different and represent straight-chain, branched-chain or cyclic alkyl or alkenyl radicals having 1 to 10 carbon atoms, which optionally have one or more carbonyl and/or ester and/or carboxyl functions.

14. Coating solution according to claim 12, wherein additionally comprises soluble polymers.

15. Coating solution according to claim 12, comprising 15 wt. % $TiO_2$.

16. Coating solution according to claim 12 wherein the solvent comprises propanediol, triethanolamine and water.

17. Coating solution according to claim 16, wherein the weight ratio of propanediol, triethanolamine and water is 60:10:30.

18. Electrochromic monitors, optical reflecting layers or photoanodes comprising the titanium-containing powder according to claim 10.

19. Microstructured layers comprising the titanium-containing powder according to claim 10.

20. A process for the photocatalytic purification of waste waters comprising treating the waste waters with a substrate having a coating comprising the titanium-containing powder according to claim 10.

21. A process for preparing electromagnetic monitors, optical reflecting layers or photoanodes comprising coating a substrate with the titanium-containing powder according to claim 10.

22. A process for preparing microstructured layers comprising the titanium-containing powder according to claim 10.

23. The process according to claim 9, wherein the auxiliary substance is polyethylene glycol.

24. The coating solution according to claim 14, wherein the soluble polymer is polyethylene glycol.

* * * * *